July 6, 1926.
C. B. FARRAR
1,591,028
HOSE PROTECTOR
Filed Oct. 31, 1922
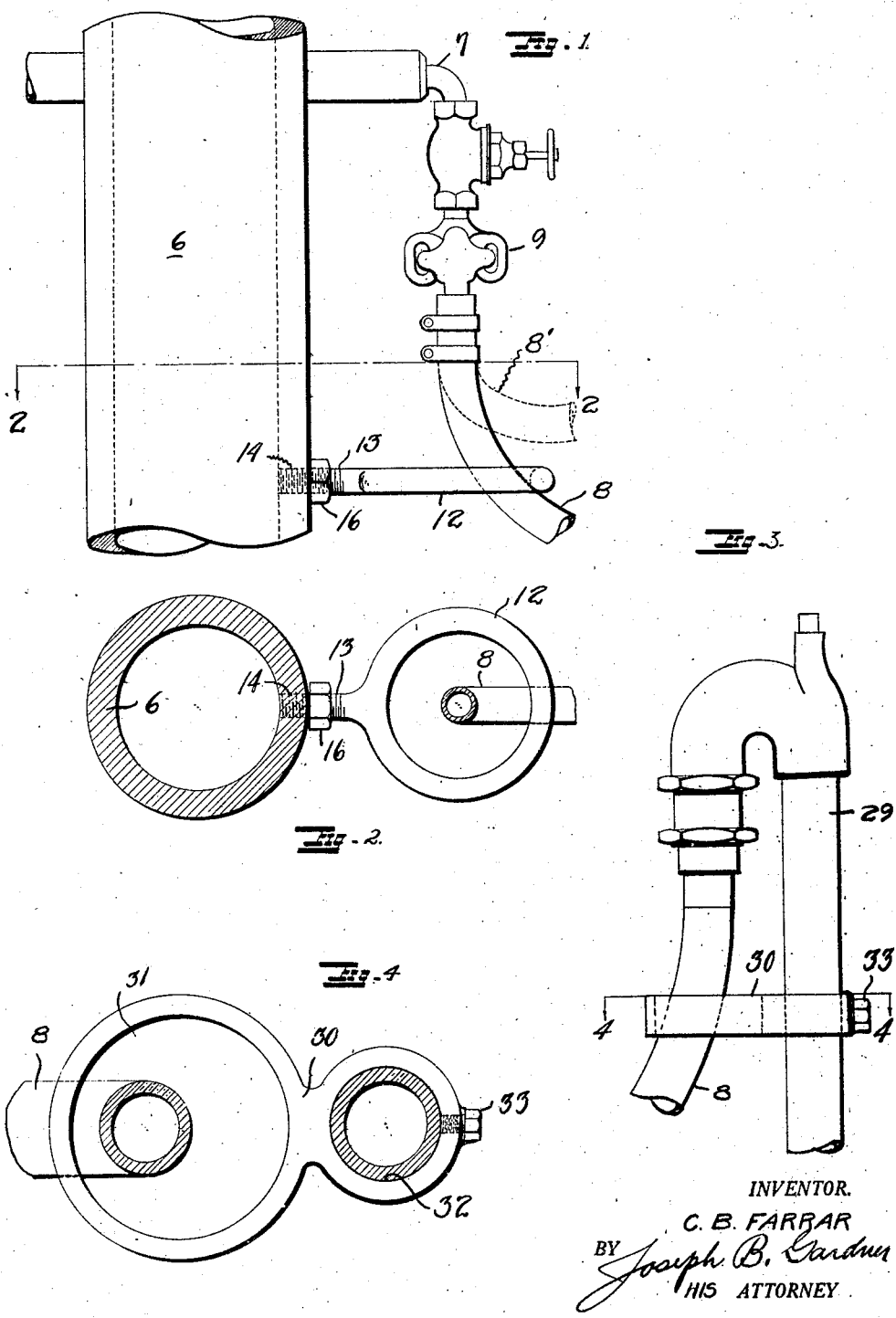
INVENTOR.
C. B. FARRAR
BY Joseph B. Gardner
HIS ATTORNEY Patented July 6, 1926.

1,591,028

UNITED STATES PATENT OFFICE.

CHARLES B. FARRAR, OF OAKLAND, CALIFORNIA, ASSIGNOR OF ONE-HALF TO EDGAR BONNEMORT, OF OAKLAND, CALIFORNIA.

HOSE PROTECTOR.

Application filed October 31, 1922. Serial No. 598,120.

My invention relates to a device for preventing the kink or sharp bend which is usually formed in a flexible hose adjacent the coupling or connection whenever the hose is pulled with undue force transversely of the coupling.

An object of the invention is to provide an extremely simple device of the character described, which will not only effectively prevent the kinking and ultimate cracking of the hose, but will prevent the breaking of the coupling by which the hose is attached to the connection.

Another object is to provide a device of the character described which will enable the hose to be pulled in any direction transversely of the coupling or connection, without subjecting said members to the strains above mentioned.

A further object is to provide a device of the character described which can readily be applied to the air and water or gasoline stands commonly used at most service stations where gasoline and oil are sold.

The invention possesses other object and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claim.

Referring to said drawings:—

Figure 1 is a side elevation of a portion of a water or air stand equipped with the hose protector of my invention.

Figure 2 is a transverse section of the structure shown in Figure 1 taken on the line 2—2 thereof.

Figure 3 is a side elevation showing an overhead discharge pipe of a gasoline pump equipped with a slightly modified form of the protector.

Figure 4 is a transverse section of the structure shown in Figure 3, the plane of the section being indicated by the line 4—4.

As illustrated in Figures 1 and 2, the device of my invention is associated with an air and water stand 6 such as with which most gasoline service stations are equipped. The stand is usually vertically disposed and is provided with one or more air or water connections 7 to which a flexible hose 8 may be attached at one end by a suitable coupling 9. The connection is designed so as to enable the coupling and attached end of the hose to depend therefrom vertically.

In the use of the hose, it is frequently pulled or stretched to take advantage of its full length. This imparts a severe strain to the connection and coupling and, as clearly indicated by the dotted lines 8' of Figure 1, causes a kink or sharp bend to form in the portion of the hose adjoining the coupling. As a result after the hose is pulled repeatedly and particularly when pulled with undue roughness it is not uncommon for the connection or coupling to become broken, and the kinked portion of the hose to become weakened and the entire hose thereby made useless. The cost of repairing the hose and connection, not to mention the inconvenience occasioned by the delay in effecting the repair, renders the foregoing a matter of considerable importance. In accordance however with the device of my invention these annoyances are entirely eliminated, and furthermore the device is of such simple character that the cost thereof is but a small fraction of the cost entailed in repairing the connection and hose in a single instance.

As here shown there is positioned below and concentrically aligned with the vertical axis of the coupling and the adjoining end of the hose, a ring 12 through which the hose is adapted to extend. By means of the threaded extension 13 which engages a correspondingly tapped hole 14 in the stand, the ring may be fixed to the stand and retained in position, a jam nut 16 being also provided so as to hold the ring secure. The inside diameter of the ring, as clearly indicated in Figure 2 is considerably greater in diameter than the exterior of the hose, so if the portion of the hose engaged therein is vertically disposed, it will be spaced from the sides thereof. However when a strong pull is exerted on the hose and transmitted to the connection, the portion of the hose within the ring will abut against the side of the ring nearest the point of application of the pull, and the portion of the hose adjoining the coupling will be caused to assume a curvature of large radius, as clearly indicated by the full lines in Figure 1. With the hose thus pressed against the ring, most of the strain otherwise transmitted to the connection, is transferred to the stand. It will thus be clear that it is practically impossible to kink the hose or break the connection.

Another advantage afforded by the position and size of the ring, is that it enables the hose to be pulled in practically any direction transversely of the coupling, with the same effectiveness and results.

In Figures 3 and 4, I have shown the device applied to an overhead discharge pipe 29 of a gasoline pump. In this embodiment the ring is substituted by a bracket member 30 provided with transversely separated openings 31 and 32. The opening 31 is adapted for engagement by the hose, whereas the opening 32 is arranged to fit around the pipe 29. The bracket member is held in fixed position on the pipe by the set screw 33.

I claim:—

The combination with a vertical stand-pipe adapted to contain a fluid and having a connection to which one end of a hose may be vertically attached, of a member having a pair of coplanar rings defining transversely separated openings having parallel axes and through which said hose and stand-pipe are respectively arranged to extend, the opening for the hose being circular in form and comparatively considerably larger than the hose and in axial alignment with the connection therefor, and means for holding said member adjustably fixed with respect to said stand-pipe.

In testimony whereof, I have hereunto set my hand at Oakland, this 26th day of October, 1922.

CHARLES B. FARRAR.